United States Patent
Tang et al.

(10) Patent No.: US 11,062,429 B2
(45) Date of Patent: Jul. 13, 2021

(54) DENOISING METHOD BASED ON SIGNAL-TO-NOISE RATIO

(71) Applicant: REALTEK SEMICONDUCTOR CORP., Hsinchu (TW)

(72) Inventors: Wan-Ju Tang, Hsinchu (TW); Tsung-Hsuan Li, Taichung (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 29 days.

(21) Appl. No.: 16/749,688

(22) Filed: Jan. 22, 2020

(65) Prior Publication Data
US 2021/0004938 A1 Jan. 7, 2021

(30) Foreign Application Priority Data

Jul. 4, 2019 (TW) .................................. 108123593

(51) Int. Cl.
*G06T 5/00* (2006.01)
*G06T 5/10* (2006.01)
*G10L 21/0232* (2013.01)
*G06T 5/20* (2006.01)

(52) U.S. Cl.
CPC ................ *G06T 5/002* (2013.01); *G06T 5/10* (2013.01); *G06T 5/20* (2013.01); *G10L 21/0232* (2013.01); *G06T 2207/20064* (2013.01)

(58) Field of Classification Search
None
See application file for complete search history.

(56) References Cited

U.S. PATENT DOCUMENTS

| 6,633,683 B1 * | 10/2003 | Dinh .................. G06K 9/40 345/611 |
| 6,928,231 B2 * | 8/2005 | Tajima ................ H04N 5/782 348/143 |
| 7,426,312 B2 * | 9/2008 | Dance .................. G06T 5/40 382/254 |

(Continued)

OTHER PUBLICATIONS

Q. Song, L. Ma, J. Cao and X. Han, "Image Denoising Based on Mean Filter and Wavelet Transform," 2015 4th International Conference on Advanced Information Technology and Sensor Application (AITS), Harbin, China, 2015, pp. 39-42, doi: 10.1109/AITS.2015.17 (Year: 2015).*

(Continued)

*Primary Examiner* — Andrae S Allison
(74) *Attorney, Agent, or Firm* — Li & Cai Intellectual Property (USA) Office (57) ABSTRACT

A denoising method based on a signal-to-noise ratio (SNR), which includes: obtaining a current input coefficient; obtaining a current noise standard deviation by querying a first relationship table; querying a second relationship table according to the current noise standard deviation and the current input coefficient to obtain a current slope corresponding to the current input coefficient; generating a current output coefficient by multiplying the current input coefficient and a compression magnification function; and calculating the current output coefficient by substituting the current noise standard deviation, the current input coefficient, and the current slope.

12 Claims, 7 Drawing Sheets

(56) References Cited

U.S. PATENT DOCUMENTS

| | | | | |
|---|---|---|---|---|
| 8,971,660 B2* | 3/2015 | Hara | ........................ | G06T 5/20 |
| | | | | 382/275 |
| 2003/0002744 A1* | 1/2003 | Lopez-Estrada | ........ | G06T 5/002 |
| | | | | 382/254 |
| 2007/0109430 A1* | 5/2007 | Staelin | ...................... | G06T 5/20 |
| | | | | 348/242 |
| 2009/0263001 A1* | 10/2009 | Ding | ....................... | G06T 5/007 |
| | | | | 382/131 |
| 2010/0225790 A1* | 9/2010 | Sasaki | .................... | H04N 5/213 |
| | | | | 348/241 |
| 2010/0231757 A1* | 9/2010 | Sambongi | .............. | H04N 5/243 |
| | | | | 348/241 |
| 2012/0189216 A1* | 7/2012 | Segall | ..................... | G06T 5/002 |
| | | | | 382/232 |
| 2013/0128123 A1 | 5/2013 | Rifkah et al. | | |
| 2013/0329004 A1* | 12/2013 | Baqai | ...................... | G06T 5/002 |
| | | | | 348/36 |
| 2018/0260937 A1 | 9/2018 | Gadi et al. | | |

OTHER PUBLICATIONS

Wikipedia, "Shot noise", https://en.wikipedia.org/wiki/Shot_noise.

* cited by examiner

DENOISING METHOD BASED ON SIGNAL-TO-NOISE RATIO

CROSS-REFERENCE TO RELATED PATENT APPLICATION

This application claims the benefit of priority to Taiwan Patent Application No. 108123593, filed on Jul. 4, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a denoising method, and more particularly to a denoising method based on a SNR.

BACKGROUND OF THE DISCLOSURE

In the field of image processing, a correction and gain multiplier is often generated by intensities of signals and energy of noises, and the correction and gain multiplier is multiplied by the input signal to obtain a reasonable result. One of the most well-known applications, for example, is to decompose the signals into components of different spatial frequencies and multiply each component by a pass rate or an enhancement rate. When one component is considered as a noise component, the component is multiplied by a value r less than 1 to suppress the noise, such as a Wiener filter known to those skilled in the art; when one component is considered to be a component that tends to be strengthened or retained the component is multiplied by a pass ratio r greater than or equal to 1, thereby obtaining clear and sharp results, as shown in the following equation (1):

$$C_{out} = r \cdot C_{in} \quad (1).$$

Another well-known application is to refer to previously processed results for assisting in processing of current data, such as Infinite Impulse Response (IRR) example shown in the following equation (2):

$$F_{out}(n) = F_{out}(n-1) + r \cdot (F_{in}(n) - F_{out}(n-1)) \quad (2).$$

When an intensity of a difference signal $F_{in}(n) - F_{out}(n-1)$ is equal to the energy of the noise, it tends to be determined as noise, and value r close to 0 is taken to result in strong denoising, otherwise the pass rate r close to 1 will be taken to speed up an update rate to avoid changing a trend of real signals.

Therefore, the value of r is determined based on a relative strength between the signal and the noise. A common quantization method for the relative strength is signal-to-noise ratio (SNR or S/N). Therefore, control of input and output through the signal-to-noise ratio can be expressed by the following equations (3) and (4):

$$SNR = \frac{P_{signal}}{P_{noise}} = \frac{A_{signal}^2}{A_{noise}^2}; \quad (3)$$

$$\text{out} = r(SNR) \cdot \text{in}. \quad (4)$$

Furthermore, the processing of the signal-to-noise ratio, whether $$SNR = \frac{P_{signal}}{P_{noise}}$$

is directly calculated or a signal difference being a few standard deviations is used to determine a magnitude of the pass rate r, an indefinite number division cannot be avoided, thus resulting in high costs from hardware calculations.

Therefore, improving the denoising method to reduce the cost of hardware calculation to overcome the above defects has become an important topic in the arts.

SUMMARY OF THE DISCLOSURE

In response to the above-referenced technical inadequacies, the present disclosure provides a denoising method based on a signal-to-noise ratio (SNR).

In one aspect, the present disclosure provides a denoising method based on a signal-to-noise ratio (SNR), the method includes: Step S1: obtaining a current input coefficient; Step S2: obtaining a current noise standard deviation corresponding to the current input coefficient by querying a first relationship table, wherein the first relationship table defines a correspondence relationship between a plurality of input coefficients and a plurality of noise standard deviations; Step S3: querying a second relationship table according to the current noise standard deviation and the current input coefficient to obtain a current slope corresponding to an absolute value of the current input coefficient in a processing function, in which the second relationship table defines a plurality of input coefficient intervals corresponding to a plurality of slopes of the processing function linearly after being approximated with the plurality of signal-to-noise ratios, and in which the processing function is defined as a compression magnification function multiplied by a signal-to-noise ratio, and the compression magnification function is a function of the signal-to-noise ratio; Step S4: generating a current output coefficient by multiplying the current input coefficient and the compression magnification function, wherein the signal-to-noise ratio is defined as an absolute value of an input coefficient divided by a noise standard deviation corresponding to the input coefficient, so that the current output coefficient is a symbol function multiplied by the noise standard deviation and the processing function; Step S5: calculating the current output coefficient by substituting the current noise standard deviation, the current input coefficient and the current slope.

Therefore, the denoising method based on SNR provided by the present disclosure can obtain denoising results of frequency domain coefficients by merely estimating a magnitude of a current noise standard deviation, querying actual values of a processing function according to input coefficients and cut points having segment linearity, without using indefinite number division. In addition, the denoising method based on SNR can also be applied to spatial domain processing or time domain processing of Infinite Impulse Response (IRR).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

A signal-to-noise ratio (SNR) is a relative ratio of a signal to a noise. A denoising strength can be adjusted according to the SNR when denoising process is performed. Weak denoising process is performed on values having high SNR and more likely to be real signals, and strong denoising process is performed on values having low SNR and more likely to be noises, thereby reducing calculations for areas such as flat areas and texture areas, while retaining self-adaptive ability based on contents of the signals. Therefore, the present disclosure provides a denoising method based on the SNR.

A frequency domain denoising process roughly includes indicating a linear combination of frequency components by change of basis processing the signals originally in spatial domain according to each frequency domain basis, and coefficient corresponding to each frequency domain component is an input coefficient $C_{in}$ corresponding to information of the spatial domain in each frequency band, and the input coefficient $C_{in}$ is processed by the denoising process. In the present embodiment, the output coefficient $C_{out}$ can be expressed by the following equation (5):

$$C_{out} = r \cdot C_{in} \quad (5);$$

where r is a compression magnification function, and $r \in [0, 1]$.

The use of the SNR as the basis for the denoising adjustment has a self-adaptive feature. When the SNR is high, it represents that more signal components are present in this component, and the original value should be retained. When the SNR is low, it represents that more noise is present in this component, and the value (or coefficient) should be corrected. This self-adaptive feature eliminates the need for other calculations for denoising strength determination, such as determinations of flat areas, texture areas, and the like, so as to save costs.

Figure 1:
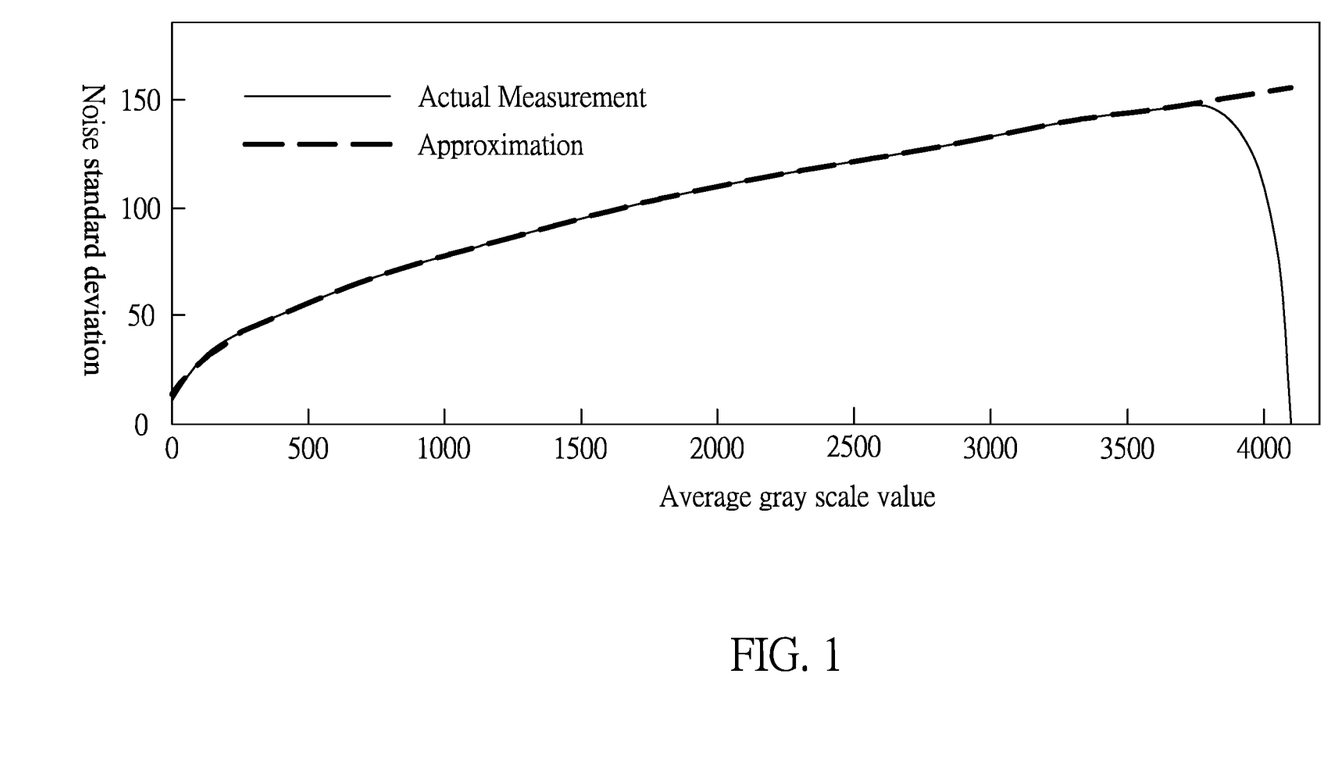
FIG. 1 is a graph showing noise standard deviations versus gray scale values according to a first embodiment of the present disclosure.

If considering the coefficient of the denoising process is adjusted based on the SNR, characteristics of noise variance must be considered. When the noise is Gaussian white noise, the noise variance is a fixed value regardless of a magnitude of the signal, and when the signal-to-noise ratio is considered, a definite number division is utilized. However, noise of an actual image sensor is Poisson noise. Reference is made to FIG. 1, which is a graph showing noise standard deviations versus gray scale values according to a first embodiment of the present disclosure. FIG. 1 shows that the noise variation varies with the intensity of the signal. When the SNR is to be considered, an indefinite number division is utilized, thereby causing high cost for hardware processing.

Therefore, in order to avoid computational indefinite number division, the present disclosure provides a denoising method based on the SNR. Here, a compression multiplication function r is expressed as a function of the SNR t, and is defined as an absolute value of an input coefficient $C_{in}$ divided by a standard deviation $\sigma$ of the noise, as shown in the following equation (6):

$$t \stackrel{def}{=} \frac{|C_{in}|}{\sigma}; \quad (6)$$

where $|C_{in}|$ is the absolute value of the input coefficient $C_{in}$ and $\sigma$ is the standard deviation of the noise.

Therefore, the output coefficient $C_{out}$ can be further expressed by the following equation (7):

$$C_{out} = f(C_{in}) = r\left(\frac{|C_{in}|}{\sigma}\right) \cdot C_{in} = r(t) \cdot \text{sgn}(C_{in}) \cdot |C_{in}|; \quad (7)$$

where $\text{sgn}(C_{in})$ is a symbol function that satisfies the condition of the following equation (8):

$$\text{sgn}(C_{in}) = \begin{cases} -1, & C_{in} < 0 \\ 0, & C_{in} = 0 \\ 1, & C_{in} > C \end{cases} \quad (8)$$

Therefore, according to the equation (6), the output coefficient $C_{ont}$ can be further expressed by the following equation (9):

$$C_{out} = r(t) \cdot \text{sgn}(C_{in}) \cdot \sigma \cdot t = \text{sgn}(C_{in}) \cdot \sigma \cdot (r(t) \cdot t) = \text{sgn}(C_{in}) \cdot \sigma \cdot h(t); \quad (9)$$

Here, a processing function h(t) is introduced, which is defined as a compression multiplication function r(t) multiplied by the SNR t as shown in the following equation (10):

$$h(t) \stackrel{\text{def}}{=} r(t) \cdot t \quad (10);$$

wherein, the type of the compression magnification function r(t) may be a linear function or a nonlinear function. For example, in a case that the Wiener filter is utilized, the compression magnification function r(t) may be expressed by the following equation (11):

$$r(t) = \frac{t^2}{t^2 + 1}. \quad (11)$$

Figure 2:
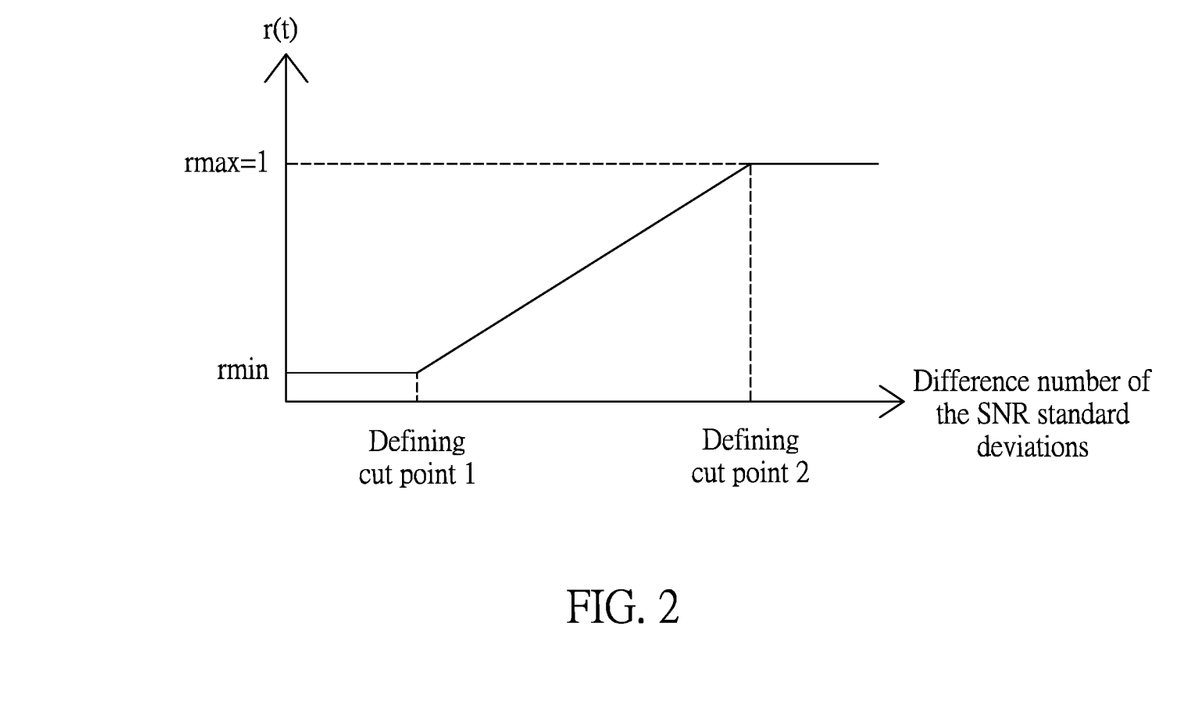
FIG. 2 is a schematic diagram showing a definition defining a compression magnification versus a difference number of SNR standard deviation according to the first embodiment of the present disclosure.

In this case, a corresponding compression magnification of the compression magnification function r(t) when the noise ratio t differs by a few standard deviations can be defined by the user, and can be defined by defined cutting points as shown in FIG. 2, FIG. 2 is a schematic diagram showing a definition defining a compression magnification versus a difference number of SNR standard deviation according to the first embodiment of the present disclosure. Depending on the SNR, the compression magnification is a value, where $r \in [0, 1]$.

Figure 3:
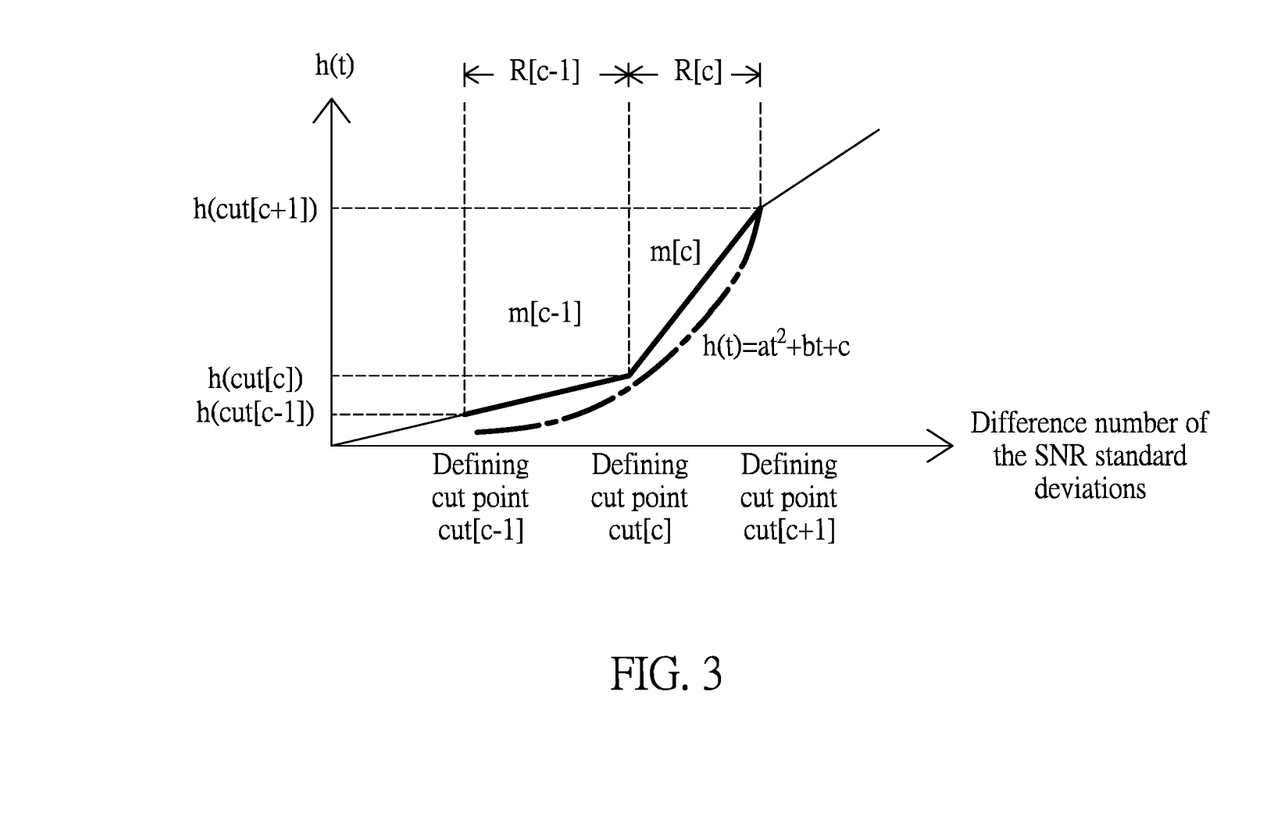
FIG. 3 is an approximate schematic diagram showing a processing function versus a difference number of the SNR standard deviations according to the first embodiment of the present disclosure.

Therefore, from the definition of equation (10), a graph showing a processing function versus a difference number of the SNR standard deviations can be further obtained by the $h(t) \stackrel{\text{def}}{=} r(t) \cdot t$ conversion. The graph shown in FIG. 3 can be obtained by converting h(t) through $h(t) \stackrel{\text{def}}{=} r(t) \cdot t$, and a quadratic equation is taken as an example. FIG. 3 is an approximate schematic diagram showing a processing function versus a difference number of the SNR standard deviations according to the first embodiment of the present disclosure. Since costs for storing complete h(t) is relatively high in actual hardware, the h(t) function is approximated by a piecewise linear method. A curve of the h(t) function can be linearly approximated by two segmentation intervals R[c−1] and R[c], for example, with defining cut points cut[c−1], cut[c], and cut[c+1]. Here, the slopes m[c−1] and m[c] are approximated in the segmentation intervals R[c−1] and R[c], respectively.

Therefore, based on the definition of the equation (6), the corresponding input coefficient intervals can be obtained in the processing function h(t) according to the input coefficient $C_{in}$. For example, when the input coefficient $C_{in}$ corresponds to the segmentation interval R[c−1], which has a starting point of cut[c−1] with a corresponding value of h(cut[c−1]) in the processing function h(t), and an end point of cut[c] with a corresponding value h(cut[c]) in the processing function h(t), and a slope between the starting point and the end point is m[c−1]. Therefore, an output coefficient $C_{ow}$ can be further expressed by the following equation (12):

$$C_{out} = \text{sgn}(C_{in}) \cdot [h(cut[c-1]) \cdot \sigma + m[c-1] \cdot (|C_{in}| - cut[c-1]) \cdot \sigma)] \quad (12).$$

Therefore, in a real-time calculation process, it is only necessary to estimate a magnitude of the current noise standard deviation σ, query an actual h function according to |Cin| and each cut point of the linear segment, and the denoised output coefficient $C_{out}$ with frequency domain coefficient can be obtained without utilizing indefinite division calculation.

Figure 4:
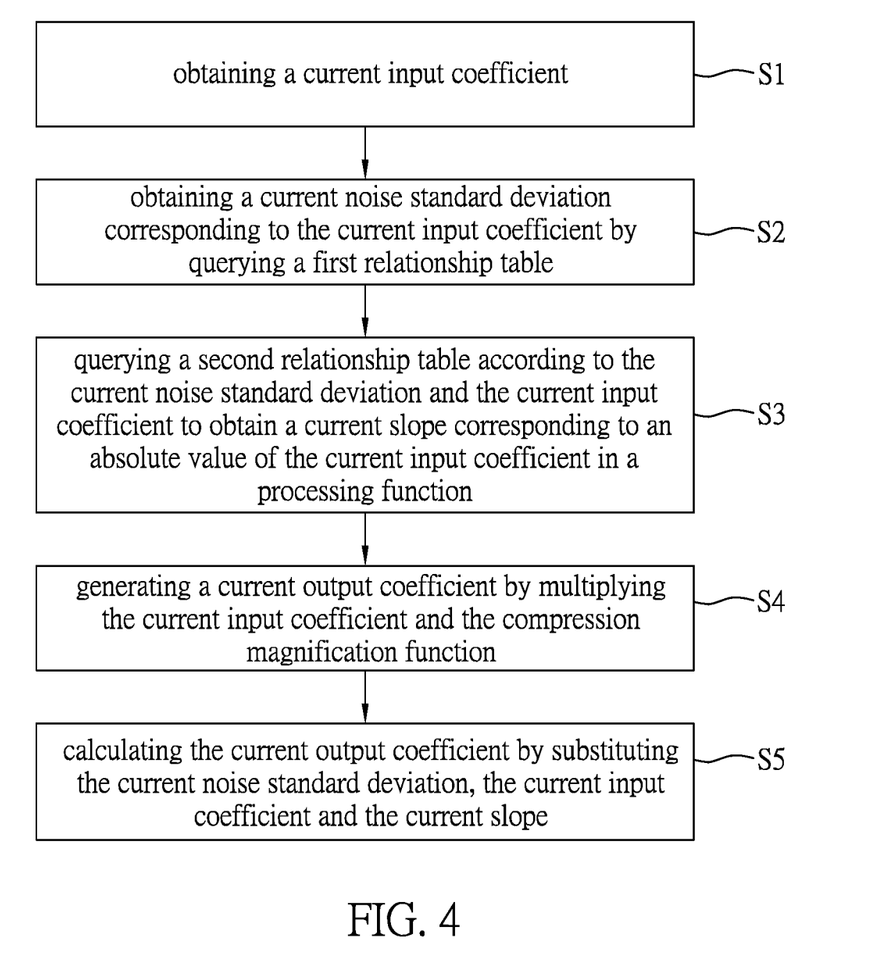
FIG. 4 is a flow chart of denoising method based on SNR according to the first embodiment of the present disclosure.

Based on the above description, reference is further made to FIG. 4, which is a flow chart of denoising method based on SNR according to the first embodiment of the present disclosure. The first embodiment of the present disclosure provides a denoising method based on SNR, which includes the following steps:

Step S1: obtaining a current input coefficient.

Step S2: obtaining a current noise standard deviation corresponding to the current input coefficient by querying a first relationship table. In this case, the first relationship table defines a correspondence relationship between a plurality of input coefficients and a plurality of noise standard deviations, and can be obtained by using a graph of noise standard deviations versus gray scale values of FIG. 1.

Step S3: querying a second relationship table according to the current noise standard deviation and the current input coefficient to obtain a current slope corresponding to an absolute value of the current input coefficient in a processing function. Here, the second relationship table defines a plurality of input coefficient intervals corresponding to a plurality of slopes of the processing function linearly after being approximated with the plurality of signal-to-noise ratios, and may be pre-established by using the approximate schematic diagram of a difference between the processing function and the SNR standard deviation of FIG. 3.

Step S4: generating a current output coefficient by multiplying the current input coefficient and the compression magnification function. Here, the SNR is defined as an absolute value of an input coefficient divided by a noise standard deviation corresponding to the input coefficient, as shown in equation (6) mentioned above. Therefore, the current output coefficient is a symbol function multiplied by the noise standard deviation and the processing function, as shown in equation (9) mentioned above.

Step S5: calculating the current output coefficient by substituting the current noise standard deviation, the current input coefficient and the current slope. Therefore, the denoised output coefficient Cout with frequency domain coefficient can be obtained by estimating the magnitude of the current noise standard deviation a, finding an actual h function according to |Cin| and each cut point of the linear segment, without utilizing indefinite division calculation.

Figure 5:
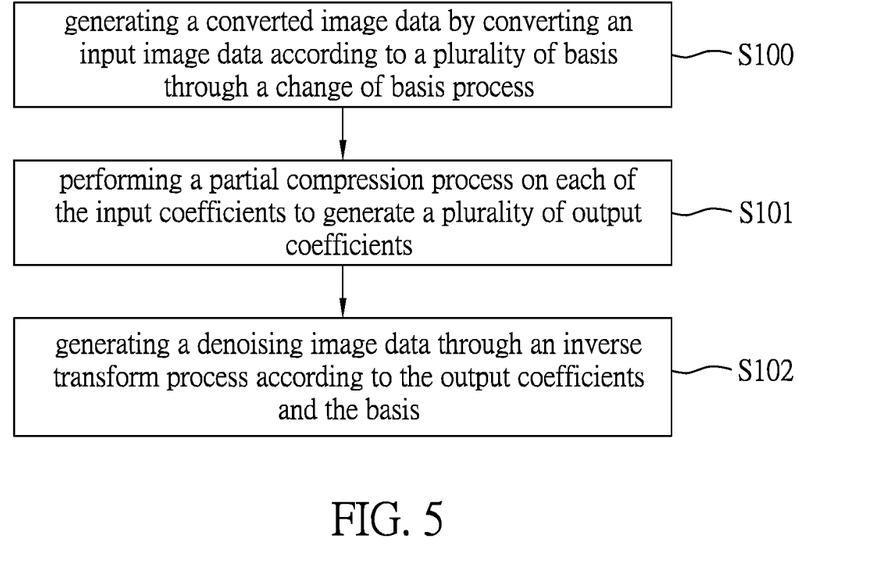
FIG. 5 is another flow chart of denoising method based on SNR according to the first embodiment of the present disclosure.

On the other hand, the denoising process can be performed in frequency domain. Reference is made to FIG. 5, which is another flow chart of denoising method based on SNR according to the first embodiment of the present disclosure. The denoising method based on SNR in frequency domain can include the following steps:

Step S100: generating a converted image data by converting an input image data according to a plurality of basis through a change of basis process. The converted image data includes a plurality of input coefficients corresponding to the plurality of basis. In detail, a linear combination of frequency components can be represented by change of basis processing the signals originally in spatial domain according to each frequency domain basis, and coefficient corresponding to each frequency domain component is an input coefficient Cin corresponding to information of the spatial domain in each frequency band.

Step S101: performing a partial compression process on each of the input coefficients to generate a plurality of output coefficients. In this case, the partial compression processing includes the steps S1, S2, S3, S4, and S5, the step S1 further includes obtaining the current input coefficient from the input coefficients, and the step S5 further includes using the current output coefficient as one of the output coefficients.

Step S102: generating a denoising image data through an inverse transform process according to the output coefficients and the basis. In other words, the plurality of output coefficients can be obtained by performing a partial compression process on each of the input coefficients, and the current output coefficient are used as the plurality of output coefficients to be converted back to spatial domain signals through the basis, that is, the denoised signal results.

Second Embodiment

Figure 6:
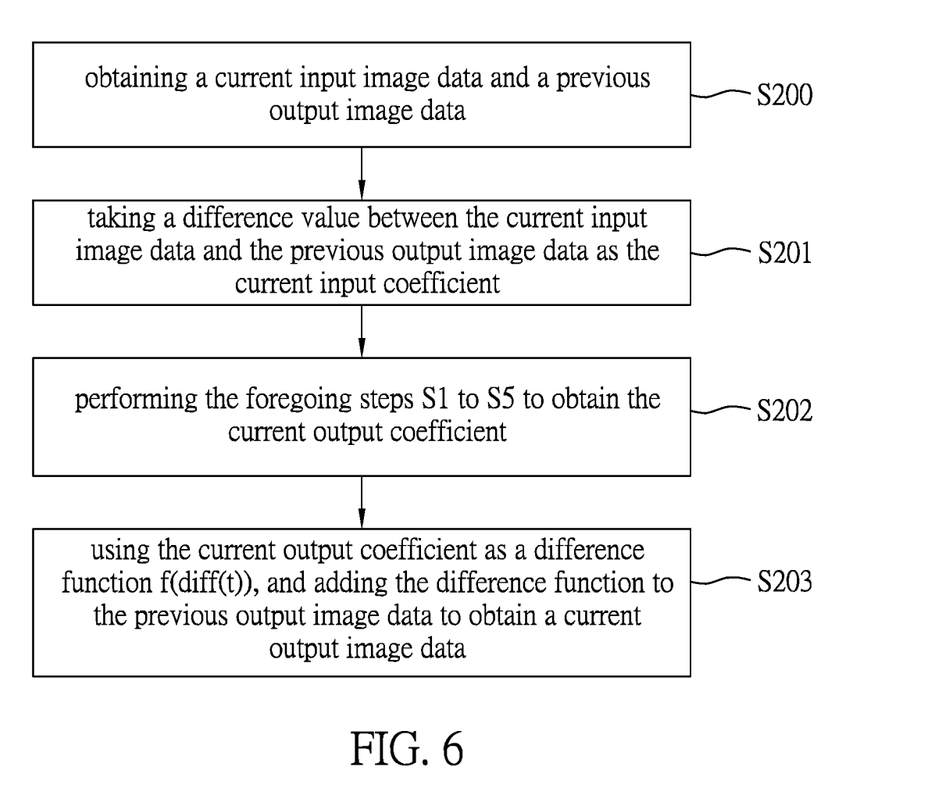
FIG. 6 is a flow chart of denoising method based on SNR according to the second embodiment of the present disclosure.

Reference is made to FIG. 6, which is a flow chart of denoising method based on SNR according to a second embodiment of the present disclosure. In this embodiment, the denoising method based on SNR can also be applied to spatial domain processing or time domain processing of Infinite Impulse Response (IRR). Specifically, the denoising method based on the SNR may include the following steps:

Step S200: obtaining a current input image data and a previous output image data. For example, the current input image data may be represented by $F_{in}(t)$, the previous output image data may be represented by $F_{out}(t-1)$, and the current input image data $F_{in}(t)$ and the previous output image data $F_{out}(t-1)$ may be two consecutive frames of images on different timing, where t is a current time, and t−1 is a previous time.

Step S201: taking a difference value between the current input image data and the previous output image data as the current input coefficient. Here, reference can be made to equation (2), a difference value diff(t) can be expressed by $f(F_{in}(t)-F_{out}(t-1))$, and thus the following equation (13) can be obtained:

$$f(F_{in}(t)-F_{out}(t-1))=r\cdot(F_{in}(t)-F_{out}(t-1)) \quad (13).$$

The difference value diff(t) is introduced, which is expressed by the following equation (14), and the difference function f(diff(t)) can be obtained and expressed by the following equation (15):

$$\text{diff}(t) \stackrel{\text{def}}{=} F_{in}(t)-F_{out}(t-1) \quad (14);$$

$$f(F_{in}(t)-F_{out}(t-1))=f(\text{diff}(t)) \quad (15).$$

Similar to the processing of equation (7), the following equation (16) can be obtained:

$$r(\text{diff}(t)) = \text{sgn}\left(\frac{|\text{diff}(t)|}{\sigma}\right)\cdot \sigma \cdot h(\text{diff}(t)). \quad (16)$$

In this case, a form of equation (16) is obviously same as the equation (9), so similarly, in a real-time calculation process, it is only necessary to estimate a magnitude of the current noise standard deviation σ, find an actual h function according to |diff(t)| and each cut point of the linear segment, and the difference function f(diff(t)) can be obtained by denoising the input difference value diff(t) without utilizing indefinite division calculation.

Step S202: performing the foregoing steps S1 to S5 to obtain the current output coefficient.

Step S203: using the current output coefficient as a difference function f(diff(t)), and adding the difference function to the previous output image data to obtain a current output image data. Here, the current output image data can be expressed by the following equation (17):

$$F_{out}(t) = F_{out}(t-1) + f(F_{in}(t)-F_{out}(t-1)); \quad (17)$$

$$= F_{out}(t-1) + f(\text{diff}(t)).$$

In an application of the time domain, when a signal of the current point $F_{in}(t)$ is close to that of the previous point $F_{out}(t-1)$, it may be assumed that the two signals are similar and can be mutually referred to each other, but when the difference between the two signals of the current point $F_{in}(t)$ and the previous point $F_{out}(t-1)$ is obvious, it may be assumed that the two signals are more likely to be different information, and thus the two signals are not mutually referred to each other to reserve sharpness.

Third Embodiment

Figure 7:
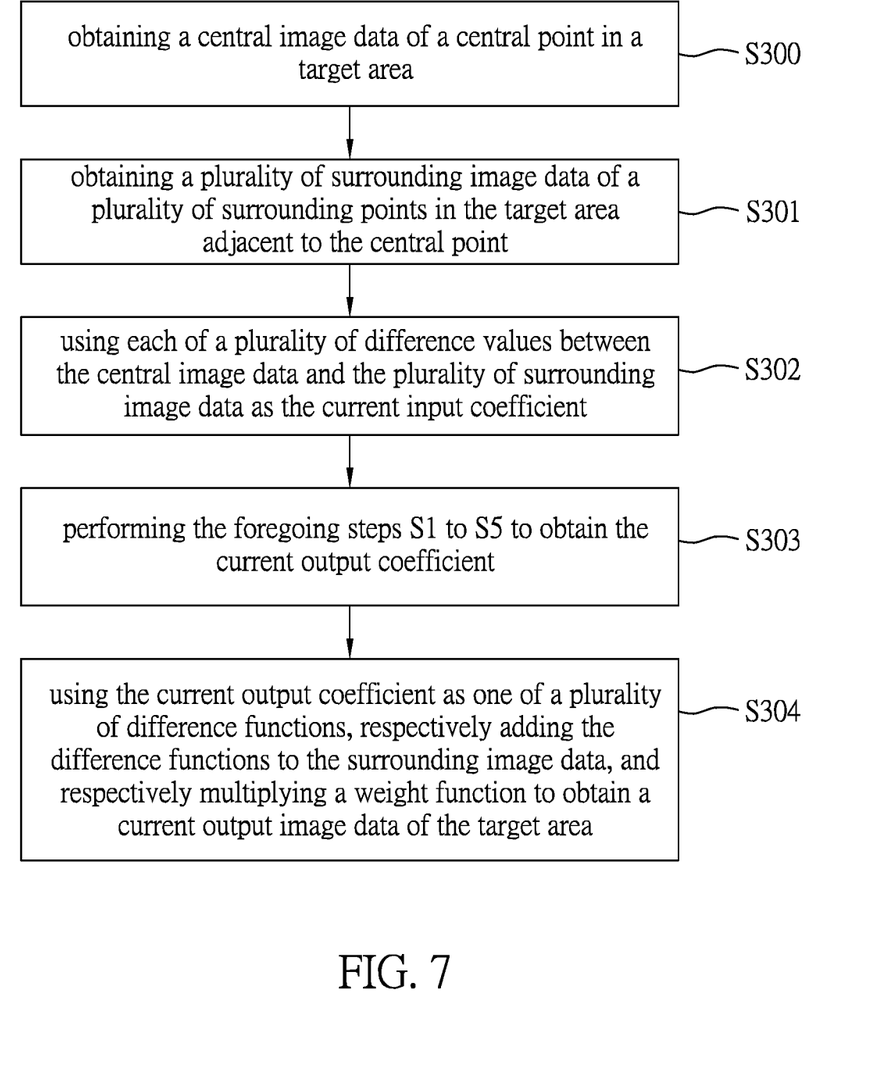
FIG. 7 is a flow chart of denoising method based on SNR according to the third embodiment of the present disclosure.

Reference is made to FIG. 7, which is a flow chart of denoising method based on SNR according to the third embodiment of the present disclosure. In this embodiment, the denoising method based on SNR can also be applied to spatial domain processing of Infinite Impulse Response (IRR). In this embodiment, Neighborhood Filter is applied, and the current output image data can be expressed by the following equation (18):

$$I_{out}(x, y) = \frac{\sum_{(u,v)\in \Omega(x,y)} w(u, v)\cdot\{I_{in}(u, v) + f(I_{in}(x, y) - I_{in}(u, v))\}}{\sum_{(u,v)\in \Omega(x,y)} w(u, v)}; \quad (18)$$

where (x, y) represent coordinates of a central point in a target area $\Omega(x, y)$, (u, v) represents the coordinates of a plurality of surrounding points around the central point, and w(u, v) are weight functions corresponding to each of the surrounding points.

The third embodiment of the present disclosure provides a denoising method based on SNR, which includes the following steps:

Step S300: obtaining a central image data of a central point in a target area.

Here, the central image data can be represented by $I_{in}(x, y)$.

Step S301: obtaining a plurality of surrounding image data of a plurality of surrounding points in the target area adjacent to the central point. Here, the surrounding image data can be represented by $I_{in}(u, v)$.

In this case, reference can be made to equation (2), the difference value diff(u, v) can be represented by $I_{in}(x, y)-I_{in}(u, v)$, and $I_{in}(x, y)$ and $I_{in}(u, v)$ can represent pixel points at different positions in the image, and I represents an energy intensity of the pixel point, and thus the following equation (19) can be obtained:

$$f(I_{in}(x,y)-I_{in}(u,v))=r\cdot(I_{in}(x,y)-I_{in}(u,v)) \quad (19).$$

The difference value diff(t) is introduced, which is expressed by the following equation (20), and the difference function f(diff(t)) can be obtained, as shown in the following equation (21):

$$\text{diff}(u,v) \stackrel{\text{def}}{=} I_{in}(x,y)-I_{in}(u,v) \quad (20);$$

$$f(I_{in}(x,y)-I_{in}(u,v))=f(\text{diff}(u,v)) \quad (21).$$

Similar to the processing of equation (7), the following equation (22) can be obtained:

$$f(\text{diff}(u, v)) = \text{sgn}\left(\frac{|\text{diff}(u, v)|}{\sigma}\right) \cdot \sigma \cdot h(\text{diff}(u, v)). \quad (22)$$

In this case, a form of equation (22) is obviously the same as the equation (9), so that similarly, in a real-time calculation process, it is only necessary to estimate a magnitude of the current noise standard deviation σ, find an actual h function according to |diff(u, v)| and each cut point of the linear segment, and the difference function f(diff(u, v)) can be obtained by denoising the input difference value diff(u, v) without utilizing indefinite division calculation.

Step S302: using each of a plurality of difference values between the central image data and the plurality of surrounding image data as the current input coefficient.

Step S303: performing the foregoing steps S1 to S5 to obtain the current output coefficient.

Step S304: using the current output coefficient as one of a plurality of difference functions, respectively adding the difference functions to the surrounding image data, and respectively multiplying a weight function to obtain a current output image data of the target area.

Here, the current output image data can be expressed by the following equation (23):

$$I_{out}(x, y) = \frac{\sum_{(u,v)\in\Omega(x,y)} w(u, v) \cdot \{I_{in}(u, v) + f(\text{diff}(u, v))\}}{\sum_{(u,v)\in\Omega(x,y)} w(u, v)}. \quad (23)$$

It should be noted that the weight functions w(u, v) can be determined according to positions of the coordinates of the surrounding points (u, v) relative to the coordinates of the central point (x, y), or the weight functions w(u, v) can be determined according to an order of the difference values d (u, v) $\stackrel{\text{def}}{=}$ |$I_{in}(x, y)-I_{in}(u, v)$|. For example, the smaller the difference value d is, the larger the weight value w is taken. The smaller the difference between the central point $I_{in}(x, y)$ and the surrounding point $I_{in}(u, v)$, the more the two are likely to be mutually referred to each other. Further, the larger the difference between the center point $I_{in}(x, y)$ and the surrounding point $I_{in}(u, v)$, the more the two are likely to have different signals, thereby reducing the referential significance.

In conclusion, the denoising method based on SNR provided by the present disclosure can obtain denoising results of frequency domain coefficients by merely estimating a magnitude of a current noise standard deviation, and querying actual values of a processing function according to input coefficients and cut points having segment linearity, without using indefinite number division. In addition, the denoising method based on SNR can also be applied to spatial domain processing or time domain processing of Infinite Impulse Response (IRR).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A denoising method based on a signal-to-noise ratio (SNR), the method comprising:
    Step S1: obtaining a current input coefficient;
    Step S2: obtaining a current noise standard deviation corresponding to the current input coefficient by querying a first relationship table, wherein the first relationship table defines a correspondence relationship between a plurality of input coefficients and a plurality of noise standard deviations;
    Step S3: querying a second relationship table according to the current noise standard deviation and the current input coefficient to obtain a current slope corresponding to an absolute value of the current input coefficient in a processing function, wherein the second relationship table defines a plurality of input coefficient intervals corresponding to a plurality of slopes of the processing function linearly after being approximated with the plurality of signal-to-noise ratios, and wherein the processing function is defined as a compression magnification function multiplied by a signal-to-noise ratio, and the compression magnification function is a function of the signal-to-noise ratio;
    Step S4: generating a current output coefficient by multiplying the current input coefficient and the compression magnification function, wherein the signal-to-noise ratio is defined as an absolute value of an input coefficient divided by a noise standard deviation corresponding to the input coefficient, so that the current output coefficient is a symbol function multiplied by the noise standard deviation and the processing function; and
    Step S5: calculating the current output coefficient by substituting the current noise standard deviation, the current input coefficient and the current slope.

2. The denoising method based on the SNR according to claim 1, further comprising:
    generating a converted image data by converting an input image data according to a plurality of basis through a change of basis process, wherein the converted image data includes a plurality of input coefficients corresponding to the plurality of basis;

performing a partial compression process on each of the input coefficients to generate a plurality of output coefficients; and generating a denoising image data through an inverse transform process according to the output coefficients and the basis, wherein the partial compression processing includes the steps S1, S2, S3, S4, and S5;

wherein the step S1 further includes: obtaining the current input coefficient from the input coefficients;

wherein the step S5 further includes using the current output coefficient as one of the output coefficients.

3. The denoising method based on the SNR according to claim 2, wherein the current output coefficient is represented by the following equation:

$$C_{out} = r\left(\frac{|C_{in}|}{\sigma}\right) \cdot C_{in};$$

wherein the current output coefficient is Cout, the current input coefficient is Cin, $$r\left(\frac{|C_{in}|}{\sigma}\right)$$

is the compression magnification function, σ is the current noise standard deviation, and $$\frac{|C_{in}|}{\sigma}$$

is defined as the SNR.

4. The denoising method based on the SNR according to claim 3 wherein the current input coefficient is represented by the following equation:

$$h(t) \stackrel{def}{=} r(t) \cdot t;$$

wherein the SNR is t, the symbol function is sgn(Cin), and the processing function is h(t), and the SNR is further represented by:

$$t \stackrel{def}{=} \frac{|C_{in}|}{\sigma};$$

wherein the processing function is further represented by the following equation:

$$h(t) \stackrel{def}{=} r(t) \cdot t.$$

5. The denoising method based on the SNR according to claim 4, wherein the symbol function is represented by the following equation:

$$\text{sgn}(C_{in}) = \begin{cases} -1, & C_{in} < 0 \\ 0, & C_{in} = 0 \\ 1, & C_{in} > 0 \end{cases}.$$

6. The denoising method based on the SNR according to claim 5, wherein the current input coefficient is represented by the following equation:

$$C_{out} = \text{sgn}(C_{in}) \cdot [h(cut[c-1]) \cdot \sigma + m[c-1] \cdot (|C_{in}| - cut[c-1] \cdot \sigma)],$$

wherein a starting point of the input coefficient interval corresponding to the current input coefficient in the processing function is cut[c−1], a value of the processing function corresponding to the starting point is h(cut[c−1]), an end point of the input coefficient interval corresponding to the current input coefficient in the processing function is cut[c], a value of the processing function corresponding to the end point is h(cut[c]), and the current slope between the starting point and the end point is m[c−1].

7. The denoising method based on the SNR according to claim 2, wherein the change of basis process includes a change of basis process in a frequency domain.

8. The denoising method based on the SNR according to claim 1, further comprising:

obtaining a current input image data and a previous output image data;

taking a difference value between the current input image data and the previous output image data as the current input coefficient; and using the current output coefficient as a difference function, and adding the difference function to the previous output image data to obtain a current output image data, wherein the difference function is a function of the difference value.

9. The denoising method based on the SNR according to claim 2, wherein the current output data is represented by the following equation:

$$F_{out}(n) = F_{out}(n-1) + f(F_{in}(n) - F_{out}(n-1)),$$

wherein the previous output image data is Fout(n−1), and the difference function is f(Fin(n)−Fout(n−1)).

10. The denoising method based on the SNR according to claim 1, further comprising:

obtaining a central image data of a central point in a target area;

obtaining a plurality of surrounding image data of a plurality of surrounding points adjacent to the central point in the target area;

using each of a plurality of difference values between the central image data and the plurality of surrounding image data as the current input coefficient; and using the current output coefficient as one of a plurality of difference functions, respectively adding the difference functions to the surrounding image data, and respectively multiplying a weight function to obtain a current output image data of the target area, wherein the difference function is a function of the plurality of difference values.

11. The denoising method based on the SNR according to claim 10, wherein the weight function is determined based on distances of the surrounding points relative to the central point.

12. The denoising method based on the SNR according to claim 10, wherein the weight function is determined according to the difference values.

* * * * *